United States Patent Office 3,414,222
Patented Dec. 3, 1968

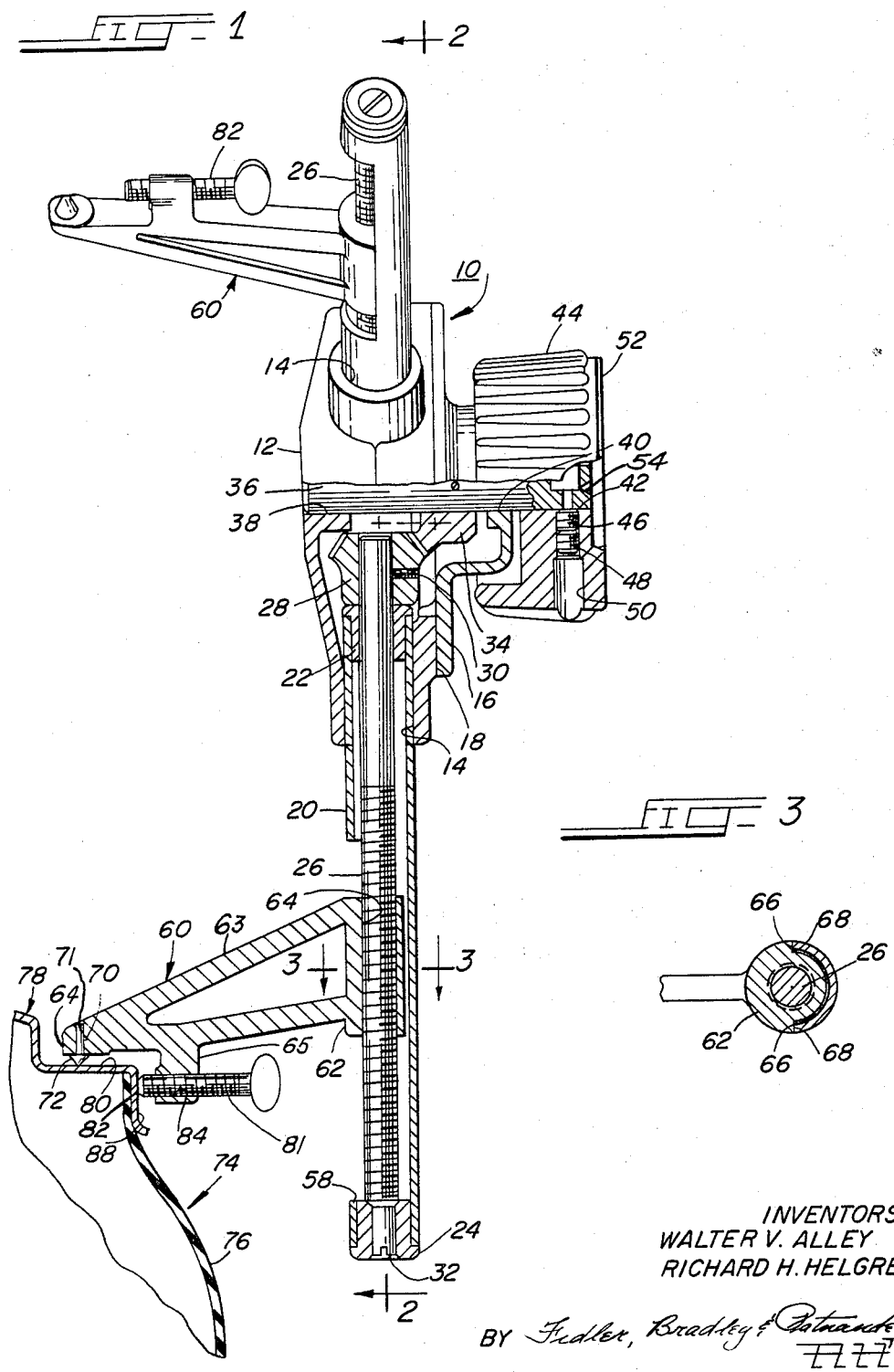

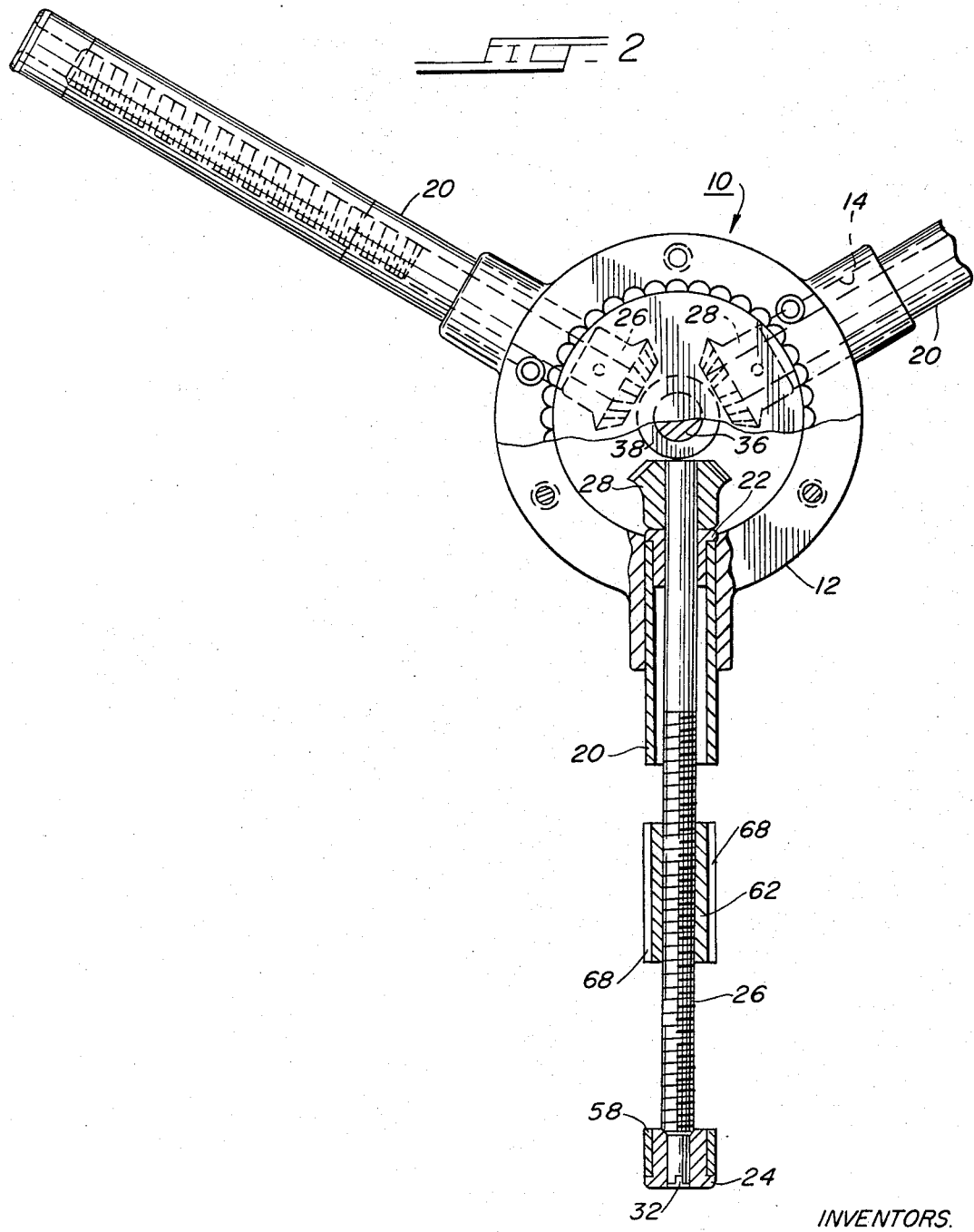

3,414,222
WHEEL GAUGE ADAPTER
Walter V. Alley, Libertyville, and Richard H. Helgren, Waukegan, Ill., assignors to Ammco Tools, Inc., North Chicago, Ill., a corporation of Illinois
Filed Apr. 5, 1967, Ser. No. 628,687
9 Claims. (Cl. 248—226)

ABSTRACT OF THE DISCLOSURE

An adapter assembly for attachment to the rim of a wheel includes three symmetrically arranged jaws mounted on arms radiating from a central housing with each jaw having one fixed and one adjustable rim engaging surface. A manually rotatable member having thereon a planar magnetic mounting surface is mounted on the housing to enable radial adjustment of the jaws.

Specification

The present invention generally relates to adapters for attachment to wheels of automotive vehicles and the like, and it relates more particularly to adapters for use in attaching service equipment such, for example, as gauges to the wheel.

When aligning the wheels of automobiles or the like, it is customary to attach either a gauge or a reference marker to the wheels in fixed relation to the axis of rotation of the wheel. It was found that this could be done by providing the gauge or other device with a permanent magnetic mount which could be placed on the hub of the axle or steering spindle and held in place thereon by magnetic attraction. As a consequence, many, if not most, such devices employ this type of magnetic mount. However, in many cases the hub surface is irregular as a result of prior damage, and therefore, before the device can be mounted thereon, any irregularities on the hub must be removed. Moreover, even where the hub has not been damaged it must be wiped clean before the device is mounted thereon or the readings to be made will be erroneous.

Therefore, a principal object of this invention is to provide an adapter which can be readily attached to the wheel to provide an accurately disposed mounting surface on which a gauge or other device may be mounted.

Another object of the present invention is to provide such adapter with a mounting surface usable with magnetic mounts.

A further object of this invention is to provide a sturdy, durable wheel adapter construction which may be easily and quickly placed on a wheel.

A still further object of this invention is to provide a new and improved method of mounting and adjusting an adapter on the rim of a wheel.

Briefly, the above and further objects may be realized in accordance with the present invention by providing a wheel adapter having a plurality of radially disposed jaws which may be simultaneously moved into clamping engagement with the rim of the wheel. Each jaw is also provided with a laterally adjustable rim engaging surface so that after the adapter has been clamped to the rim, each of the jaws may then be laterally adjusted on the rim until the mounting surface of the adapter lies in a plane parallel to the actual plane of rotation of the wheel.

Further objects and advantages, and a better understanding of the present invention may be had by reference to the following detailed description and the accompanying drawings, wherein:

FIGURE 1 is a side elevational view, partly in section, showing the manner in which the wheel adapter of the present invention may be attached to the rim of a wheel;

FIGURE 2 is a fragmentary, rear elevational view, partly in section, of the adapter assembly of FIG. 1; and FIGURE 3 is a sectional view taken along the line 3—3 of FIG. 1.

Referring now to the drawings, there is shown a wheel adapter assembly 10 comprising a generally cup-shaped housing member 12 having three symmetrically arranged radially extending bores 14. The cavity within the housing 12 is enclosed by a substantially circular cap member 16 which fits over an annular mounting flange 18 and is suitably secured to the housing 12 by means of a plurality of machine screws threadedly received in tapped holes in the flange 18.

Three identical tubular housing members 20 are press-fitted into the bores 14 and suitably secured thereto, as, for example, by welding, and a pair of journal bushings 22 and 24 are press-fitted into the inner and outer ends, respectively, of each of the tubes 20. Rotatably mounted in each pair of bushings 22 and 24 is a lead screw 26 to the inner end of which a bevel gear 28 is secured as by means of a set screw 30.

The outer end portion of the lead screw 26 is provided with a screwdriver slot 32 for use in making initial adjustments to the adapter assembly 10 when it is first assembled.

The three bevel gears 28 mate with and are adapted to be rotated by a drive bevel gear 34 which is pinned to a shaft 36 rotatably mounted in aligned bores 38 and 40 in the housing assembly 12 and the cap plate 16, respectively. The shaft 36 extends a substantial distance outwardly of the plate 16 where it is received in a central bore 42 in a knob or spinner 44. The knob 44 is fixed to the shaft 36 by means of a set screw 46 which is threadedly received in a radial bore in the knob. As shown, a second set screw 48 may be provided for locking the first set screw 46 in place. This radial aperture in the knob 44 is counterbored at 50 to facilitate the insertion therein of a tool for tightening or loosening the set screws 46 and 48.

The knob or spinner 44 has a plurality of external ribs 45 to facilitate handling thereof and it is preferably formed of magnetic material such, for example, as iron. A planar mounting surface 52 is machined on the outer face of the spinner 44 to provide a magnetic mounting surface. A centrally disposed center hole 54 is provided in the end surface of the shaft 36 for accommodation of axially extending locating members proved on some magnetic mounts.

Each of the tubular housing members 20 is provided with an elongated, longitudinally extending slot 58 for receiving a jaw member 60. Each jaw 60, which may be a metal casting, includes a generally cylindrical portion 62 from which a web portion 63 extends. At the end of the web 63 there is provided a boss 64, and a lug 65 extends from the web in parallelism with the cylindrical portion 62. A threaded bore 67 is provided in the portion 62 for receiving the lead screw 26. As best shown in FIG. 3, rotation of the jaw 60 relative to the tube 20 is prevented by interengagement between the edges 66 of the slot 58 and the radial flanges or ledges 68 on the tubular portion 62 of the jaw 60.

A fixed mounting surface for engaging the rim of the wheel on which the adapter 10 is to be mounted is provided by a hardened metal pin 70 having a shank portion press-fitted into a bore 71 provided in the boss 64. The pin 70 has a generally conical head portion 72 for engagement with the rim of the wheel. In FIG. 1, there is shown a portion of a wheel 74 comprising a tire 76 mounted on a rim 78. Conventionally, wheel rims have a cylindrical portion 80 which is concentric with the axis of the wheel and it is against this surface 80 which the fixed mounting surface of the jaw 60 is adapted to engage and hold the adapter in place.

A laterally adjustable mounting surface is also provided on the jaw 60 by means of a thumb screw 81 threadedly received in a hole 84 in the lug 65. The end 82 of the thumb screw is rounded and is adapted to engage the outer annular surface 88 of the wheel rim. The axis of the two mounting surfaces provided by the pin 70 and the screw 82 are thus mutually orthogonal.

*Operation*

In use, the knob 44 is rotated in a counterclockwise direction until the jaws define a circle smaller than that defined by the rim portion 80 of the wheel on which the adapter is to be mounted. The adapter is then placed on the wheel with the jaws extending within the rim portion 80 and the knob 44 is rotated clockwise until the jaws 60 have moved radially outwardly such that the pins 70 are in clamping engagement with the rim. A suitable level such as a spirit level is then placed against the mounting surface 52 with the axis of the level generally at right angles to the plane of the surface 52. Several wheel alignment gauges include such a level and they can, therefore, be used for this purpose. The wheel 74 is then rotated while the level is held by the operator against the surface 52 while keeping the bubble at the top. The thumb screws 82 are then adjusted to move the adapter relative to the rim 78 until rotation of the wheel has no effect on the position of the bubble in the level. With this accomplished, the mounting surface 52 lies in a plane parallel to the plane of rotation of the wheel and whatever gauge or reference device is mounted thereon will be accurately positioned relative to the planar rotation of the wheel. Accordingly, any run-out which the wheel may have is thus compensated for.

There is thus provided in accordance with the present invention an adapter assembly which may easily and quickly be mounted on a wheel to provide an accurately positioned mounting surface for gauges, indexing devices and other equipment. The clamping mechanism is strong and durable, and the location of the lateral adjustment screws at a substantial distance from the axis of rotation of the associated wheel facilities precise adjustment of the mounting surface 52 relative to the axis of rotation of the wheel. Moreover, the three jaws 60, being adjusted at the time of assembly to be equi-spaced from the shaft 36, insures that the conical centering hole 54 is located on the axis of rotation of the wheel.

While the present invention has been described in connection with particular embodiments thereof, it will be understood that those skilled in the art may make many changes and modifications without departing from the true spirit and scope of this invention, and therefore, it is intended in the appended claims to cover all such changes and modifications which fall within the true spirit and scope of this invention.

We claim:
1. An adapter assembly for attachment to a wheel to provide a mounting surface lying in a plane parallel to the plane of rotation of said wheel, comprising
   a housing on which said mounting surface is disposed,
   a plurality of arms secured to and extending radially from said housing,
   a plurality of wheel engaging jaws respectively mounted on said arms,
   each of said jaws having a fixed wheel engaging surface thereon,
   means for simultaneously moving all of said jaws in the directions of the longitudinal axes of said arms to move said wheel engaging surfaces into mutual abutment with said wheel, and
   each of said jaws also having mounted thereon an adjustable wheel engaging surface disposed orthogonally to the associated one of said fixed surfaces.
   whereby said jaws are simultaneously movable to secure said adapted assembly to said wheel and said adjustable surfaces are independently movable to orient said mounting surface parallel to the plane of rotation of said wheel.
2. The invention set forth in claim 1 wherein
   said arms each include a lead screw on which the associated one of said jaws is threadedly mounted, and
   said means for simultaneous adjustment includes a gear train connected to said lead screws and means for manually driving said gear train.
3. The invention set forth in claim 2 wherein
   said mounting surface is disposed on said means for manually driving said gear train.
4. The invention set forth in claim 1 wherein
   said mounting surface is a plane surface on a rigid, magnetic member.
5. The invention set forth in claim 2 wherein
   each of said arms further includes a rigid tubular member in which the respective lead screw is journaled,
   each tubular member having a longitudinal slot therein through which the associated jaw extends.
6. The invention set forth in claim 5 wherein
   said gear train includes a plurality of bevel gears respectively secured to said lead screws and a drive bevel gear mating with each of said plurality of bevel gears and mounted on a shaft lying along the axis from which said arms radiate, and
   said means for driving said gear train includes a knob secured to said shaft.
7. The invention set forth in claim 6 wherein
   the end surface of said knob is formed of magnetic material and said mounting surface is provided thereby.
8. The invention set forth in claim 7 wherein
   said fixed rim engaging surfaces are provided by hardened metal pins lying parallel to said lead screws, and
   said adjustable rim engaging surfaces are on the ends of screws threaded to bored apertures in said jaws,
   said pins and said screws being in mutually orthogonal relationship.
9. The invention set forth in claim 5 wherein said mounting surface is provided with a hole centrally disposed relative to said fixed mounting surfaces in said jaws.

References Cited
UNITED STATES PATENTS

| | | | |
|---|---|---|---|
| 1,506,977 | 9/1924 | Dichinolf et al. | |
| 2,577,841 | 12/1951 | Creagmile | 33—203.18 |
| 2,780,939 | 2/1957 | Kellogg | 73—458 |
| 2,952,435 | 9/1960 | McMillan | 248—205 |
| 3,058,712 | 10/1962 | Posson | 248—205 |
| 3,094,003 | 6/1963 | Hemmeter | 73—458 |
| 3,143,327 | 8/1964 | Watt | 248—205 |

ROY D. FRAZIER, *Primary Examiner.*

J. F. FOSS, *Assistant Examiner.*